Oct. 7, 1958  L. A. OHLINGER ET AL  2,855,355
JACKETED URANIUM SLUG
Filed Nov. 28, 1945

Witnesses:
Herbert E. Metcalf
Walter L. Schlegel, Jr.

Inventors:
Leo A. Ohlinger
Charles M. Cooper
By:
Robert A. Sawyer
Attorney.

United States Patent Office 2,855,355
Patented Oct. 7, 1958

2,855,355

JACKETED URANIUM SLUG

Leo A. Ohlinger, Chicago, Ill., and Charles M. Cooper, Newark, Del., assignors to the United States of America as represented by the United States Atomic Energy Commission Application November 28, 1945, Serial No. 631,412

8 Claims. (Cl. 204—193.2)

This invention relates to a novel method and means for indicating leakage of a normally fluid-tight jacket or container enclosing a substance expansible upon contact with a fluid. More particularly, the invention relates to jacketed uranium slugs or pellets for use in a neutronic reactor and to a novel method and means for detecting leakage of coolant fluid into the jackets enclosing said slugs.

In neutronic reactors a neutron fissionable isotope such as $U^{233}$, $U^{235}$, or $94^{239}$ or mixtures thereof is subjected to fission by absorption of neutrons, and a self-sustaining chain reaction is established by the neutrons evolved by the fission. In general such reactors comprise bodies of compositions containing such fissionable material, for example, natural uranium, disposed in a neutron slowing material which slows the neutrons to thermal energies. Such a slowing material is termed a neutron moderator. Carbon, and $D_2O$ (heavy water) are typical moderators suitable for such use. Heat is evolved during the reaction which is removed by passage of a coolant through the reactor in heat exchange relationship therewith. Specific details of the theory and essential characteristics of such reactors are set forth in copending application of Enrico Fermi and Leo Szilard, Serial No. 568,904, filed December 19, 1944, now Patent No. 2,708,656, dated May 17, 1955.

The fissionable material within reactors of the above described type is customarily in the form of elongated cylindrical slugs or pellets enclosed within fluid-tight cylindrical jackets or containers of neutron permeable material such as aluminum. The jacketed slugs are disposed end to end in stringers or columns within coolant channels through the neutron moderator, and a coolant such as oxygen or water is passed through said channels. Leakage of the slug jackets permits the coolant to enter the same and oxidize the slugs whereupon the slugs expand or swell and frequently become jammed within the coolant channels thereby requiring shutdown and disassembly of the reactor in order to effect removal of the slugs.

Inasmuch as each slug is usually in tight thermal contact with its associated jacket, leakage of coolant therebetween is a slow capillary action; and it is, therefore, an object of the invention to convey the leakage coolant directly to the end of the slug thereby causing longitudinal expansion thereof which may be quickly detected by visual observation or by any suitable device for indicating longitudinal expansion of the stringer or column of slugs within the reactor. The expanded stringer may then be removed before radial expansion of the defective slug due to the above-mentioned capillary leakage therealong causes the same to become jammed within the coolant channel.

A more specific object of the invention is to provide each jacket or container with a flexible cap member and with a sealing member having a substantially fluid-tight fit within the container in tight abutment with the cap member and the end of the slug. A fluid passage is provided between the end of the slug and the connection between the cap member and the container, said passage being partially defined by an interstice between one of said members and the end of said slug, whereby leakage fluid is conveyed to said interstice and causes the slug to expand longitudinally thereof, thereby exerting a thrust on the cap to flex the same outwardly. This flexure increases the length of the composite slug structure and may be detected as above described, whereupon the defective slug may be quickly removed from the reactor.

If desired, the jacketed slug may be tested before inserting the same into the reactor by immersing the slug in water and detecting longitudinal expansion of the slug either by visual observation or by any suitable means for measuring an increase in the length of the slug.

The foregoing and other objects and advantages of the invention will become apparent in view of the following specification read with reference to the drawings, wherein.

Figures 2, 3:
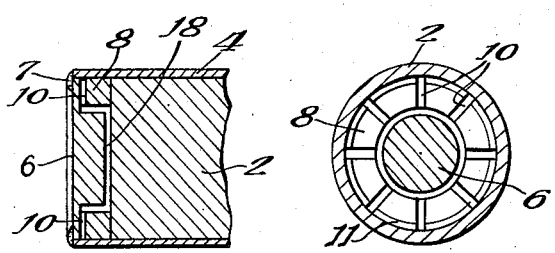
Fig. 2 is a sectional view taken in the plane indicated by the line 2—2 of Fig. 1.
Figure 4:
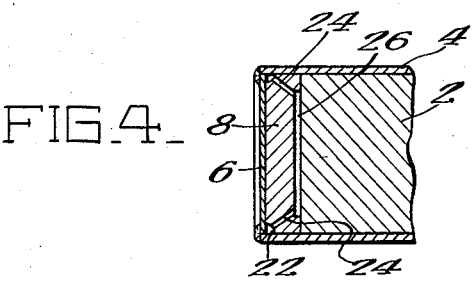
Figure 6:
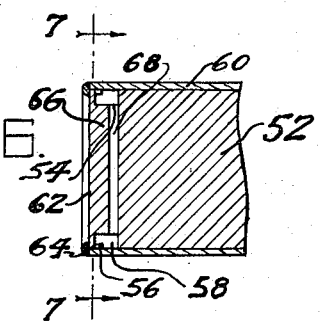
Figure 5:
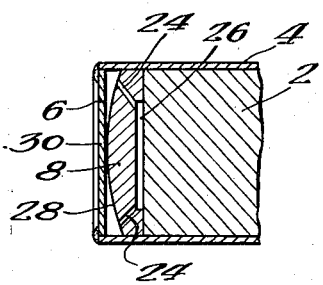
Figure 7:
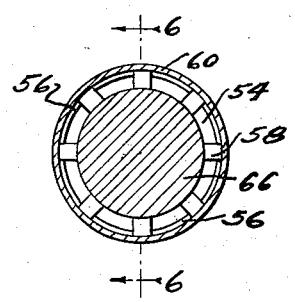

Figs. 3 to 5 inclusive, are fragmentary longitudinal sectional views, each illustrating a modification of the invention; and Figs. 6 and 7 illustrate still another embodiment of the invention, Fig. 6 being a fragmentary sectional view taken in a plane approximately bisecting the structure longitudinally thereof, as indicated by the line 6—6 of Fig. 7, and Fig. 7 being a sectional view taken in the transverse plane indicated by the line 7—7 of Fig. 6.

Figure 1:
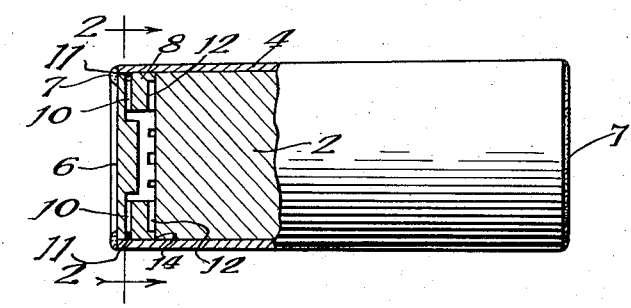
Fig. 1 is a view in side elevation of a composite slug structure embodying the invention, said structure being partially shown in longitudinal section.

Describing the invention in detail and referring first to the preferred embodiment thereof illustrated in Figs. 1 and 2, the uranium body is preferably in the form of a cylindrical slug or pellet 2 disposed within an aluminum casing or sleeve 4, each end of which is sealed by a flexible aluminum cap or cover 6 welded to the casing 4 as at 7 to define a fluid-tight container enclosing the slug 2. An annular aluminum member 8 is tightly fitted within the casing 4 in substantially fluid-tight engagement therewith, said member having tight flat face engagement with the cover 6 and with the end of the slug 2. The axially outer or forward face of the member 8 is provided with a plurality of radial passages or grooves 10 extending between the radially inner and outer perimeters of said member, said grooves 10 being connected by an annular groove or recess 11, and the axially inner or rear face of said member is provided with a plurality of radial passages or grooves 12 terminating short of the radially outer perimeter of said member, whereby the latter is effective to afford a substantially fluid-tight seal at 14 between the meeting surfaces of the end of the slug 2 and the inner perimeter of the casing 4.

It may be noted that the grooves 10 and 12 define with the flexible cap 6 a fluid passage between the adjacent end of the slug 2 and the connection between the casing 4 and the cap 6. Thus, if a coolant such as water passing over the composite structure leaks into the casing through the welded connections at 7, said leakage thereby closing the interstices at 12 between the slug 2 which is thus oxidized or corroded. The chemical products resulting have a lesser density than the metal being protected, and these products expand longitudinally thereby closing the interstices at 12 betwee nthe slug 2 and the sealing member 8 and exerting an outward thrust on the latter to flex the cap 6 outwardly.

If the thrust of the member 8 against the cap 6 breaks the connection at 7 between the cap and the casing 4, the damage to the structure is inconsequential, inasmuch as the resultant elongation of the structure indicates a leak; and the slug is immediately removed from the reactor before capillary leakage between the casing 4 and the cylindrical perimeter of the uranium body 2 can result in radial swelling of the structure.

As above described, the jacketed slugs in a neutronic reactor are arranged end to end in abutting relationship to form stringers or columns of fissionable material within the coolant channels in the neutron moderator. Suitable indicating means (not shown) are provided for indicating longitudinal expansion of each stringer or column, and the slugs in that stringer are removed from the reactor and are replaced to prevent damage to the device should the indicating means show elongation of the column. However, if desired, each jacketed slug may be tested prior to insertion within the reactor by immersing the structure in a fluid such as water or oxygen under pressure and detecting longitudinal expansion of the structure by visual observation or by any suitable device for measuring elongation of the structure.

The composite structure shown in Figs. 1 and 2 may be fabricated by fitting the members 2 and 8 within the casing 4 and then welding a cap 6 thereto at each end thereof; or the structure may be fabricated by inserting the members 2 and 8 within a casing 4 of sufficiently great internal diameter to afford a very loose fit with said members. The casing may then be passed through a die to draw or compress the casing into tight thermal contact with the members 2 and 8, and thereafter the caps may be welded to the casing 4.

It may be noted that, if desired, the casing 4 may be formed as a drawn can, casting or forging with one open end which may be sealed by the members 6 and 8 in the manner above described.

Fig. 3 shows a modification of the invention wherein the grooves 12 in the inner face of the member 8 are eliminated and an elongated cylindrical lug or boss 18 is provided on the inner face of the cap 6 to define an interstice with the adjacent end of the uranium slug 2, whereby longitudinal expansion thereof provides a direct thrust against the cap 6 to flex the latter outwardly thereby affording indication of leakage through the welded connection at 7.

Fig. 4 shows another modification of the invention wherein the member 8 is provided with an annular groove or recess 22 at the meeting edges of the forward face and the outer perimeter of said member. A plurality of passages 24 are provided through the member 8 in the inner or rear face of the member 8.

Fig. 5 shows still another modification of the invention which is similar to that shown in Fig. 4 except that the member 8 is provided with a convex forward face 28 to afford a projection bearing at 30 against the cap 6 at a point substantially centrally thereof. The member 8 is provided as in the embodiment of Fig. 4 with a plurality of passages 24 communicating with a recess 26 in the inner or rear face of the member 8.

Each of the embodiments of Figs. 3 to 5, inclusive, may be fabricated in substantially the same manner as that described in connection with the preferred embodiment of Figs. 1 and 2.

Figs. 6 and 7 show still another embodiment of the invention wherein a cylindrical uranium slug or pellet 52 is counterbored at each end thereof to provide an annular projection 54 having an annular groove or recess 56 machined therein at the meeting surfaces of the forward face and the radially outer perimeter thereof. Each projection 54 is milled to provide a plurality of radial fluid passages 58 therethrough.

A jacket 60 of neutron permeable material, such as aluminum, is drawn over the slug 52 in thermal contact therewith; and a cap or cover 62 of neutron permeable material, such as aluminum, is welded at 64 (Fig. 6) to each end of the jacket, thereby forming therewith a normally fluid-tight container around the slug 52.

Each cap is preferably provided with an inwardly extending boss 66 projecting inwardly of the annular projection 54 and defining an interstice 68 with the adjacent end of the slug 52, whereby any leakage fluid passing through the welded connection at 64 is conveyed through the passages 58 into the interstice 68, thereby contacting the end of the slug 52 which swells longitudinally and exerts a thrust against the boss 66 to flex the cap 62 outwardly. It may be noted that any leakage fluid entering the jacket 60 between the passages 58 is conveyed thereto through the annular recess 56.

It will be understood that the above-described embodiments of the invention are illustrative thereof, and many modifications may be made therein without departing from the intended scope of the invention which is limited solely by the appended claims.

What is claimed is:

1. An article of manufacture comprising, in combination, a cylindrical solid non-porous body, said body being impervious to the passage of fluid and chemically active with at least one fluid to form a solid product of larger volume, a cylindrical fluid-tight container surrounding said body and in thermal contact therewith, said container having at least one open end, a flexible cap sealed to the open end of the container, a round rigid sealing member tightly fitted within the casing between the cap and the body in fluid-tight engagement with the inner perimeter of the container and the adjacent surface of the body, said sealing member being provided with at least one fluid passage extending from a point adjacent to the seal between the cap and the container to a point between the end of the body and the cap, whereby fluid leakage through the seal may chemically combine with the body to form a solid product and force the cap outwardly.

2. An article of manufacture comprising the elements of claim 1 wherein the sealing member comprises a round disc, said member having a convex surface in contact with the cover, a shallow recess on the surface confronting the end of the body, and at least one fluid passage extending through the member from a point contiguous to the seal between the cap and the container to the recess.

3. An article of manufacture comprising the elements of claim 1 wherein the solid body includes uranium.

4. An article of manufacture comprising the elements of claim 1 wherein the sealing member comprises a round member having a flat surface engaging the cap and an opposite surface in flat face fluid-tight engagement with the body, the center portion of said latter surface being provided with a shallow recess, and said member having at least one fluid passage extending from the recess to the surface confronting the seal between the container and the cap.

5. An article of manufacture comprising the elements of claim 1 wherein the round rigid sealing member comprises a ring of substantially rectangular cross section, the outer peripheral surface of said ring being in fluid-tight engagement with the inner periphery of the container and the surface of said ring adjacent to the body being in fluid-tight engagement therewith, said ring being provided with at least one groove extending from the outer peripheral surface thereof to the inner peripheral surface thereon on the surface adjacent to the cap.

6. An article of manufacture comprising the elements of claim 5 wherein the round rigid sealing member comprises a ring provided with an annular groove adjacent to the outer peripheral surface thereof on the surface adjacent to the cap, and a plurality of radial grooves extending from said annular groove to the inner peripheral surface on the surface adjacent to the cap.

7. An article of manufacture comprising the elements of claim 1 wherein the round rigid sealing member comprises a ring provided with radial grooves on the surface adjacent to the body extending from the inner peripheral surface a portion of the way toward the outer peripheral surface.

8. An article of manufacture comprising the elements of claim 1 wherein the round rigid sealing member is integral with the body and comprises a ring portion having an outer peripheral surface in fluid-tight engagement with the inner periphery of the container, said ring portion being provided with at least one groove extending from the outer peripheral surface thereof to the inner peripheral surface on the surface adjacent to the cap.

References Cited in the file of this patent

UNITED STATES PATENTS

| | | |
|---|---|---|
| 314,180 | Hutchings | Mar. 17, 1885 |
| 1,301,241 | Fenlon | Apr. 22, 1919 |
| 2,362,796 | Boesel | Nov. 14, 1944 |

FOREIGN PATENTS

| | | |
|---|---|---|
| 861,390 | France | Oct. 28, 1940 |
| 233,011 | Switzerland | Oct. 2, 1944 |

OTHER REFERENCES

Mrak and Rubert: "The Swelling of Canned Prunes," Bulletin 508, University of California College of Agriculture, Agricultural Experiment Station, Berkeley, Calif., February 1931, page 3.

Smyth: "Atomic Energy for Military Purposes," August 1945. Copy may be purchased from Supt. of Doc., Washington 25, D. C.